Oct. 9, 1962 J. A. WEIDENHAMMER 3,057,569

TAPE FEED MECHANISM

Original Filed May 28, 1952 7 Sheets-Sheet 1

INVENTOR
JAMES A. WEIDENHAMMER
BY [signature]
ATTORNEY

Oct. 9, 1962 J. A. WEIDENHAMMER 3,057,569

TAPE FEED MECHANISM

Original Filed May 28, 1952 7 Sheets-Sheet 2

INVENTOR
JAMES A. WEIDENHAMMER
BY [signature]
ATTORNEY

INVENTOR
JAMES A. WEIDENHAMMER
BY
ATTORNEY

Oct. 9, 1962 J. A. WEIDENHAMMER 3,057,569

TAPE FEED MECHANISM

Original Filed May 28, 1952 7 Sheets-Sheet 4

INVENTOR
JAMES A. WEIDENHAMMER
BY [signature]
ATTORNEY

Oct. 9, 1962 J. A. WEIDENHAMMER 3,057,569

TAPE FEED MECHANISM

Original Filed May 28, 1952 7 Sheets-Sheet 5

INVENTOR
JAMES A. WEIDENHAMMER
BY
ATTORNEY

INVENTOR
JAMES A. WEIDENHAMMER
BY [signature]
ATTORNEY

Oct. 9, 1962 J. A. WEIDENHAMMER 3,057,569

TAPE FEED MECHANISM

Original Filed May 28, 1952

7 Sheets-Sheet 7

INVENTOR
JAMES A. WEIDENHAMMER
BY P. E. Henninger
ATTORNEY

United States Patent Office 3,057,569

Patented Oct. 9, 1962

3,057,569

TAPE FEED MECHANISM

James A. Weidenhammer, Poughkeepsie, N.Y., assignor to International Business Machines Corporation, New York, N.Y., a corporation of New York Original application Sept. 19, 1955, Ser. No. 535,052, which is a continuation of Ser. No. 290,396, May 28, 1952. This application Dec. 11, 1961, Ser. No. 158,299
29 Claims. (Cl. 242—55.12)

This invention relates to a machine for reeling, unreeling and feeding tape.

This application is a division of James A. Weidenhammer and Walter S. Buslik application for United States patent, Serial No. 535,052, filed September 19, 1955, which latter application was, in turn, a continuation of Weidenhammer and Buslik application for United States patent, Serial No. 290,396, filed May 28, 1952, now abandoned.

The claims of said joint application, Serial No. 535,052, are concerned with the concept of effectively divorcing the inertia of the tape reels from the tape feeding mechanism by which the tape is fed through a tape processing station. The claims of this application are directed to the broader aspects of maintaining loops of tape in tape loop chambers associated with the tape reels and also to the control of the tape reels under the influence of the tape loops so maintained.

More particularly, the invention herein relates to a machine for feeding a record tape through a record reading and/or reproducing head. The invention was conceived as an adjunct to an electronic computing machine, but may be usefully employed in other environments where high speed tape feeding is a requirement.

With the advent of electronic computing machines, the need for rapid data input and data recording means has become very acute. Heretofore the speed at which data could be read from or recorded upon a record medium was in part limited by the speed at which existing equipment could feed such records through a record sensing or recording station.

The present invention contemplates a record tape feeding mechanism capable of feeding a record tape through a reading and recording head at a speed of 200 feet per second, with an acceleration and deceleration time of not more than .005 second, and with the ability to reverse direction of tape feed in ten milliseconds or less.

Production of high speed tape feeding equipment having rapid acceleration, rapid deceleration, and rapid braking rates encounters the difficulty that record tapes have no great tensile strength and that machines designed to handle such tapes must, therefore, impose no substantial tension on the tape. It is, therefore, the primary object of this invention to provide a record tape feeding mechanism which is capable of feeding a record tape through a record reading or reproducing head at high speed without imposing any substantial tension on such tape.

These and other objects and advantages of the invention are attained in a tape feeding mechanism having a pair of tape reels which may be independently rotated for either reeling or unreeling tape thereon. It is contemplated that each tape reel be power driven through a clutch mechanism which is adapted to selectively drive the reel in either direction.

The clutch mechanisms herein are under control of the position of a tape loop depending from each reel and the control system is so designed as to maintain the tape loops substantially constant in length.

The tape loops provide a tape source upon which a tape feeding mechanism may call for tape to be fed through a record reading or recording head in either direction.

The mechanism for feeding the tape through the record reading and recording head is power driven, but in all respects independent of the power by which the tape reels are rotated. The details of this latter mechanism is the subject matter claimed in Weidenhammer and Buslik United States Patent No. 2,792,217, dated May 14, 1957. By means of the mechanism briefly described, the tape may be reeled or unreeled and fed through a record reading or reproducing head at high speed and without substantial tension on the tape.

The details of the mechanism illustrated in the drawings for the purpose of showing an operative embodiment of the invention will become clear as the description proceeds. In the drawings like reference numerals indicate like parts, and:

Figure 1:
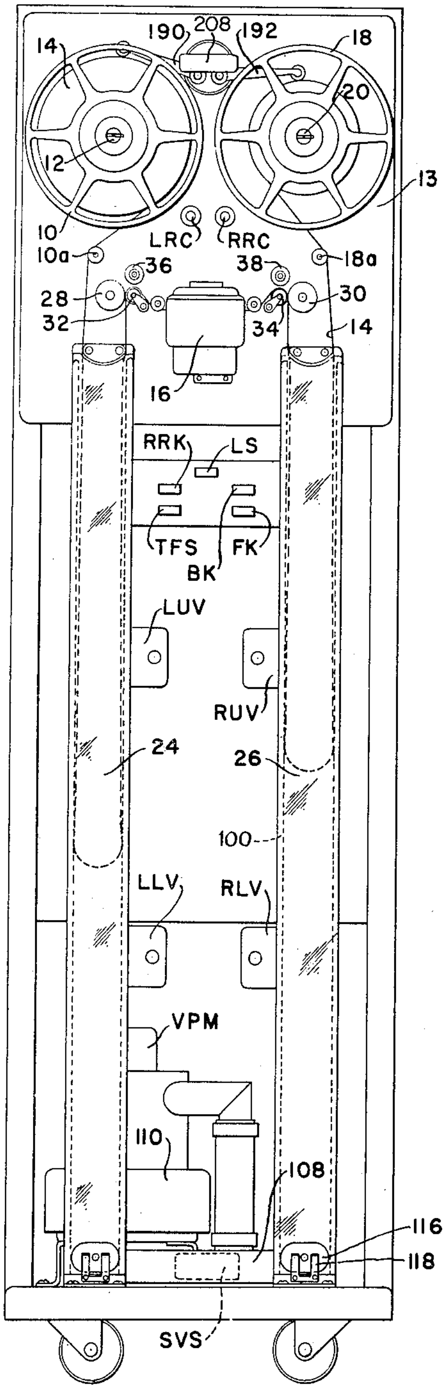
FIG. 1 is a front elevational view of the tape feeding mechanism with which this invention is concerned.
Figure 2:
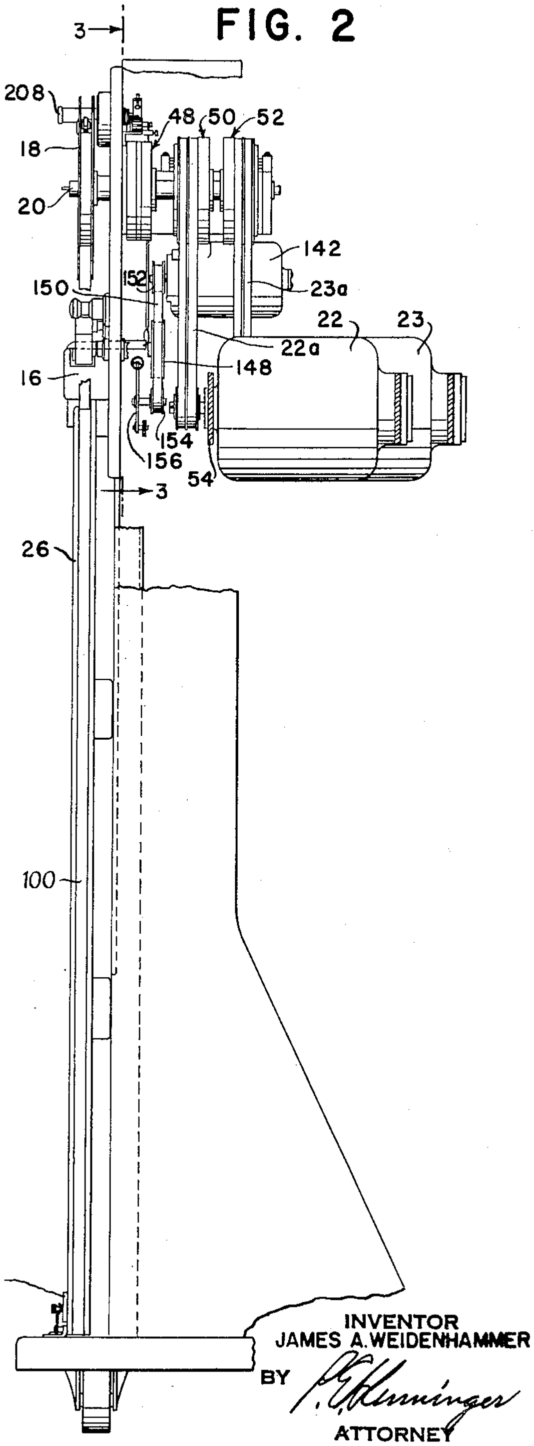
FIG. 2 is a side elevational view of the tape feeding mechanism with the upper portion of the outer casing broken away to show the location of underlying mechanism.

A general understanding of the machine and its function may be attained by reference to FIGS. 1 and 2 of the drawings. A pair of tape reels adapted to hold a coil of record tape are intermittently driven to provide a pair of tape loops upon which the mechanism for feeding the tape through the tape sensing head may call as the tape is to be fed in either of two directions. A tape reel 10 which shall be designated as a file reel is mounted on a drive spindle 12. It may be assumed that the reel 10 has thereon a coil of tape 14 on which data has been recorded and from which the tape is to be fed through a tape reading and recording head 16. In its forward feed direction, the tape will pass through the tape reading head 16 and will be coiled on a second reel 18 which may be designated herein as a machine reel. The machine reel 18 is mounted on a drive spindle 20.

The file reel drive spindle 12 and the machine reel drive spindle 20 are selectively rotated in either direction by a pair of motors 22 and 23. The motors 22 and 23 normally impart constant drive to a pair of electromagnetic clutch mechanisms mounted on each of the drive spindles 12 and 20. An electromagnetic brake is mounted on each of the drive spindles so that the spindles 12 and 20 may be locked against rotation. The nature of the electromagnetic clutches and the electromagnetic brake will be developed in greater detail at a later point herein.

Upon selective clutching of the electromagnetic clutch mechanisms in drive relation to the drive spindles 12 and 20, these spindles and consequently the tape reels attached thereto may be caused to reel or unreel tape from the coil thereon.

Since the mechanism is designed for high speed feed of tape through the tape processing head 16, it is important that a supply of tape be provided with little load or tension thereon, and to this end the driving mechanism for the reels 10 and 18 provides a pair of tape loops disposed in a pair of tape control columns 24 and 26. Each of the columns 24 and 26 has therein means responsive to the position of the respective tape loops for maintaining a relatively stable position of these loops within the columns. The loop sensitive means within the columns 24 and 26 control the reel drive mechanism in such manner that the loops, so to speak, are self-compensating. The tape reel drive mechanism for each reel operates independently of the other, and both reels are driven independently of feed of tape through the tape head 16.

Tape from the loop supply in the columns 24 and 26 is driven through the tape head 16 by means of a pair of constantly rotating tape drive capstans. In FIG. 1 a tape drive capstan 28 may be deemed to be constantly rotated in a clockwise direction, and may consequently be designated as the reverse drive capstan. A similar constantly rotating capstan 30 may be deemed to be driven in a counterclockwise direction and may, therefore, be designated as the forward drive capstan. In connection with the drive capstans 28 and 30, there are provided a pair of tape moving idler pulleys 32 and 34. The pulley 32 is adapted to move a tape trained thereabout into driving contact with the reverse drive capstan 28, while the tape moving pulley 34 is adapted to move a tape trained thereabout into driving contact with the forward drive capstan 30. As fully taught in said Weidenhammer and Buslik Patent 2,792,217, and to a more limited extent herein, the tape moving idler pulleys 32 and 34 are mounted on a common linkage system which is so designed as to impart the proper related movement to the pulleys for selectively driving a tape either in a forward or a rearward direction through the tape head 16.

A non-rotary stop capstan is also associated with each of the tape moving idler pulleys, so that these pulleys may be moved into contact with their related stop capstans to hold the tape stationary. Thus the idler pulley 32 has associated therewith a stop capstan 36 which we shall designate herein as the forward stop capstan, and the tape moving idler pulley 34 has associated therewith a stop capstan 38 which we shall designate as the reverse stop capstan.

Figure 3:
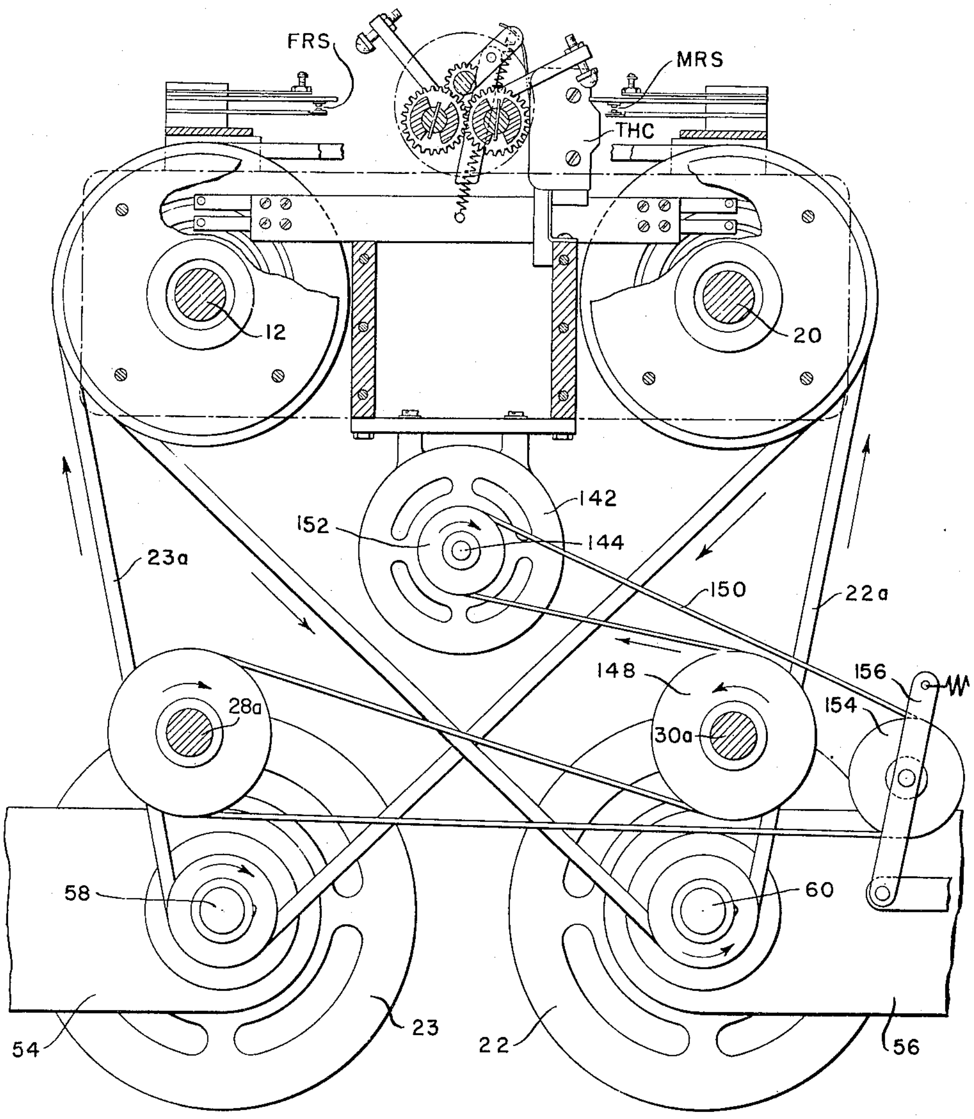
FIG. 3 is a view on line 3—3 of FIGS. 2 and 4 illustrating the tape driving mechanism and certain adjuncts thereto.
Figures 4, 5:
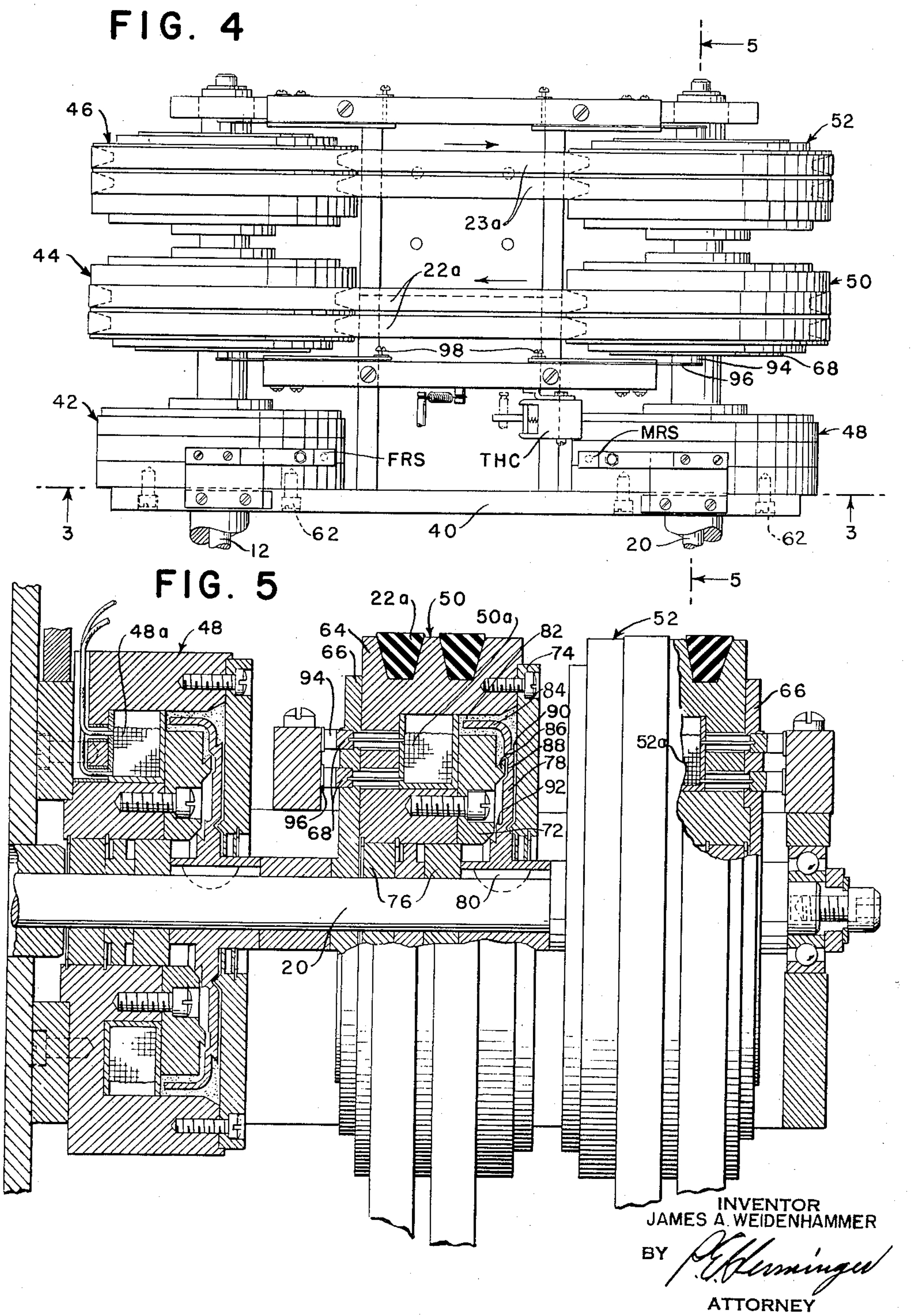
FIG. 4 is a plan view of the tape reel drive mechanism comprising electromagnetic clutches and brakes.
FIG. 5 is a view on line 5—5 of FIG. 4 showing parts in cross-section and other parts in full line.

The mechanism for driving the tape reels 10 and 18 may now be referred to in connection with FIGS. 3, 4 and 5 of the drawings. The spindles 12 and 20 are mounted for rotation in a frame member 40. The spindle 12 has mounted thereon a file reel brake 42, an electromagnetic reeling clutch 44 and an electromagnetic unreeling clutch 46.

The machine reel spindle 20 has mounted thereon an electromagnetic machine reel brake 48, an electromagnetic unreeling clutch 50 and an electromagnetic reeling clutch 52.

The drive rings of the clutch elements 44, 46, 50 and 52 are adapted for continuous rotation under the influence of the drive motors 22 and 23.

By reference to FIG. 3 of the drawings, it will be seen that the drive motors 22 and 23 are mounted on supporting structures 54 and 56 respectively, in such position that the motor shafts 58 and 60 respectively extend forwardly into substantially vertical alignment with their related magnetic clutch structures.

By reference to FIG. 4 of the drawings it will be seen that the first pair of clutches 44 and 50 are in substantial, transverse alignment on their respective shafts and that the second pair of clutches 46 and 52 are also in substantial, transverse alignment on their respective shafts. The clutches 44 and 50 are driven in a counterclockwise direction by the motor 22 through a drive belt **22*a* while the clutches 46 and 52 are driven in a clockwise direction by the motor 23 through a drive belt 23*a*, the motor shaft 58 having a normal clockwise rotation and the motor shaft 60** having a normal counterclockwise rotation.

Noting FIG. 1 of the drawings, it may be seen that the file reel 10 is disposed for reeling tape thereon when driven in a counterclockwise direction, while the machine reel 18 is disposed for tape winding upon clockwise rotation. In light of this arrangement, the clutch 44 operates as a reeling clutch for the file reel 10 while the clutch 50 operates as an unreeling clutch for the machine reel 18. By the same token the clutch 46 operates as an unreeling clutch for the file reel 10, while the clutch 52 operates as a reeling clutch for the machine reel 18.

The file reel brake 42 and the machine reel brake 48 each has the outer shell thereof fixed to the frame member 40 by means of machine screws 62, thereby providing an anchor for these shells when either brake is energized to lock its respective shaft against rotation.

FIG. 5 of the drawings illustrates the specific nature of the brake and clutch units. These units are of identical structure, and a description of the clutch 50 will therefore suffice as a description of all. The driving member 64, including the ring or shell 50, is mounted on the shaft 20 for free rotation thereon. The driving member includes an end plate 66 in which is mounted a pair of commutator rings 68 which provide a current path for an electromagnetic coil **50*a* mounted within an annular recess in the driven member 64 and held therein by an annular plate 72. The opposite face of the structure has fixed thereto a closure plate 74. Suitable hub rings 76 support the driving member for rotation on the shaft 20**.

A driven member 78 is spaced from and disposed between the annular plate 72 and the closure plate 74. The driven member 78 is keyed to the shaft 20 by means of a suitable keying structure 80.

It will be apparent now that when the driving member 64 and the driven member 78 are caused to rotate in unison, drive will be imparted to the shaft 20. Such drive coupling is achieved through the use of iron powder disposed between the driving member 64 and the driven member 78. The circumference of the annular plate 72 is such that its periphery is spaced from the inner wall of the recess formed in the driving member 64. This in effect forms an annular channel adapted to receive an inturned flange 84 of the driven member 78. The inturned flange 84 is so positioned as to provide a substantially equal space on opposite faces thereof in reference to the oppositely disposed walls of the annular channel. Iron powder in a sufficient amount to substantially fill the remaining space of the channel will serve to "freeze" the iron powder and thereby clutch the inturned flange 84 of the driven member 78 to the driving member 64 of the clutch structure whenever the coil **50*a*** is energized.

Centrifugal force acting on the iron powder ordinarily maintains the powder in the channel adjacent the inturned end 84 of the driven member 78. However, in order to avoid possibility of the loss of the powder into the bearing structure of that assembly, the annular plate 72 is provided with an annular rib 86 which extends into an annular groove 88 on the inner face of the driven member 78. The annular rib 86 is outwardly slanted to provide a trough for powder that may find its way inwardly along the clutch structure. A similar rib 90 is formed on the outer face of the driven member 78 for preventing passage of powder inwardly along the outer face of the driven member. Any residual particles of powder will be caught in a groove 92 that is formed in the inner face of the driven member near the axial portion thereof.

The commutator rings 68 are in contact with a brush 94 carried on the end of a resilient contact strip 96 which is connected into the control circuit by means of terminal screws 98 (FIG. 4).

The clutches at the rear end of the spindles 12 and 20 are of the same construction as that described hereinabove, and their mounting on their respective shafts is the same except that they are reversed so that the end plate 66 is oppositely disposed to present the commutator rings in a more accessible position. The brake assemblies 42 and 48 are also constructed exactly like the clutch assembly just described, and the manner of mounting these on their respective shafts is also the same with the exception that the end plate 66, and consequently the shell or what would correspond in the clutch assembly to the driven member, is held stationary. It now follows that the energization of the coils in the several clutch assemblies will result in the corresponding forward or reverse drive of the respective spindles 12 and 20. By the same token these spindles will be held against rotation whenever the coil in the brake assembly associated therewith is energized. Since the shells of the brakes 42 and 48 are fixed, the leads for energizing the electromagnetic coils therein may be taken through the end wall of the brake assemblies. As will be seen at a later point herein, the control circuit is such that drive through either of the clutches on a drive spindle will take place only upon deenergization of the associated brake assembly coil, and that ordinarily the coil in the brake assembly will be energized to hold its associated spindle against rotation when the clutch coils are deenergized.

Figure 7:
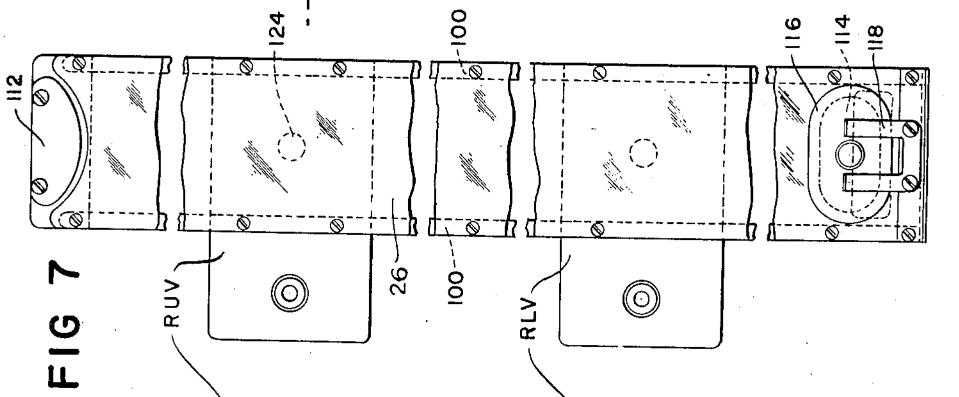
FIG. 7 is a front elevational view of the vacuum column of FIG. 6.
Figure 6:
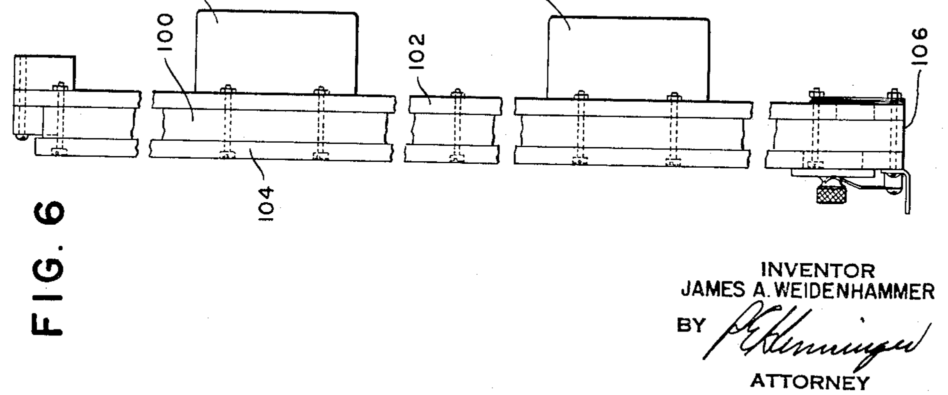
FIG. 6 is a side elevational view of a vacuum column provided for tape loop control.

It has been mentioned heretofore that the position of the tape loops in control columns 24 and 26 is utilized to control the rotary movement of the tape reels. Herein, by way of example, there has been illustrated a vacuum switch control system for achieving this objective. The control columns 24 and 26 are of the same construction, and the specific nature thereof may best be seen in FIGS. 6 and 7 of the drawings. In these figures of the drawings is illustrated the control column 26 shown at the right in FIG. 1. However, since the column 24 is of the same construction, a description of FIGS. 6 and 7 will serve as a description of both control columns. The column herein illustrated comprises a pair of side walls 100, a back panel 102, a transparent face panel 104 and a bottom wall 106, all joined together in air-tight contact.

At the base of the columns 24 and 26 is a header 108 with which the columns communicate. The header 108 is connected with a vacuum pump 110 adapted to be driven by a suitable motor VPM. The foregoing provides a structure by means of which the control columns 24 and 26 may be evacuated when the upper ends thereof are closed against the atmosphere.

At the upper end of each control column is a guide plate 112, whose arcuate lower face is slightly spaced from a corresponding arcuate upper edge of the transparent face panel 104. The lateral extremities of the guide plate 112 serve to support the opposite bights of a tape loop within the control column and the arcuate slot formed between the lower arcuate face of the guide block and the upper edge of the face panel constitutes a guide through which a tape loop may be threaded for insertion into the control column. The face plate 104 has formed at the bottom thereof a hand opening 114 normally closed by an air-tight closure 116 held in position by a spring clip 118. This opening constitutes a clean-out passage.

The side walls 100 of the vacuum columns 24 and 26 are of a width substantially equal to the width of the tape 14. When a tape loop is formed, therefore, in either of the vacuum columns 24 or 26, the oppositely disposed marginal edges of the loop will be in substantial contact with the base plate 102 and the face plate 104 of the respective vacuum columns. The back of the tape in the tape loop is spaced from the side walls of the vacuum columns through substantially the entire length of the loop but the bight of the loop is in substantial contact with the side walls. This disposition of the tape loop within the vacuum columns 24 and 26 is assured by the tape guide structure. As the tape comes from the file reel 10, it passes over a guide idler 10*a*. As the tape is fed to and from the machine reel 18, it too passes over a guide idler 18*a*. The horizontal distance between the outer periphery of the guide idler 10*a* and the drive capstan 28 is somewhat less than the spacing of the inner faces of the column side walls 100. The same is true of the horizontal spacing of the guide idler 18*a* and the drive capstan 30 at the right of the structure.

The particular horizontal spacing of the guide idlers and their associated drive capstans assures that the inner face of the tape is in contact with the oppositely disposed ends of the guide plate 112 at the top of the vacuum columns 24 and 26. These guide plates, therefore, determine the spacing of the tape bights at the entrance to the columns. Since the distance between the ends of the guide plate 112 is somewhat less than the internal width of the vacuum columns, the back of the tape will be spaced slightly from the column side walls through the major portion of the tape loops, the loops, however, widening out at their lower ends to contact the side walls of the columns, thereby forming an air seal between the lower portion of the tape loop and the column walls.

Figure 8:
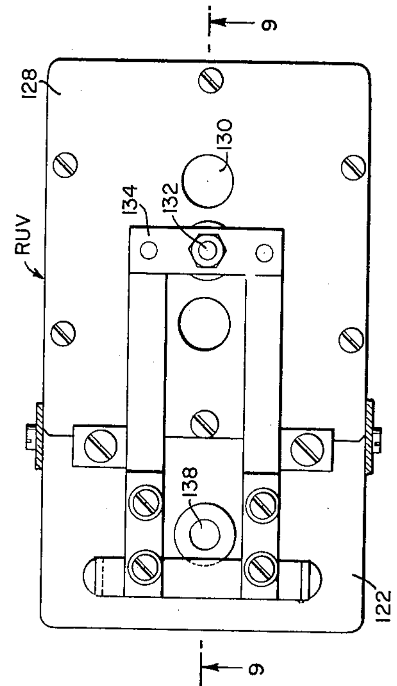
FIG. 8 is a plan view of a vacuum operated switch (with cover removed) used in connection with the vacuum columns of FIGS. 6 and 7.
Figure 9:
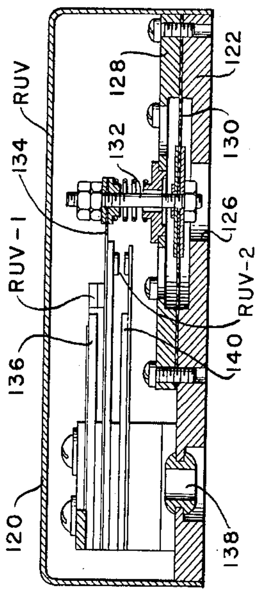
FIG. 9 is a cross-sectional view on line 9—9 of FIG. 8.

Spaced along the length of each of the control columns 24 and 26 are two vacuum operated switches, the details of which are shown in FIGS. 8 and 9. In FIG. 1 of the drawings the vacuum switch LUV is the left upper vacuum switch, while the switch LLV is the left lower vacuum switch. In similar fashion the control column 26 has a right upper vacuum switch RUV and a right lower vacuum switch RLV.

The vacuum switches have a normally closed contact point and a normally open contact point. The switches communicate with the interior of their respective control columns through an aperture in the back plate 102 thereof. By reference to FIG. 9, it will be seen that the switch structure is encased in a shell 120 which fits tightly against a base plate 122, the base plate being attached to the back panel 102 of the control column so that an aperture 124 of the back panel registers with a passage 126 in the base 122 of the switch structure. Within a cavity formed between the base plate 122 of the switch structure and an overlying block 128 is a pressure responsive diaphragm 130 to which a contact operating shaft 132 is attached, this connection between the diaphragm and the shaft 132 being air-tight. Adjustably secured to the opposite end of the contact operating shaft 132 is a spring contact finger 134 having contact points thereon adapted to contact corresponding points on fixed contact fingers 136 and 140.

In FIG. 9 the spring contact finger 134 has a contact point on the upper surface thereof which is adapted to engage a contact point on the fixed contact finger 136. These contacts are normally closed contacts and are designated herein as the RUV–1 contacts. On the lower face of the spring contact finger 134 is a second contact point which is adapted to engage a corresponding contact point on the fixed contact finger 140. These contact points are normally open and are designated herein as the RUV–2 contact points. In FIG. 9 the contact points shown therein are associated with the upper right vacuum switch. A similar structure is provided for the right lower vacuum switch RLV, the left upper vacuum switch LUV and the left lower vacuum switch LLV (FIG. 1). In the circuit description in respect to FIG. 13 of the drawings it will be seen that the left upper vacuum switch LUV has a pair of points LUV–1 and LUV–2 which correspond to the points RUV–1 and RUV–2 described in connection with FIG. 9. The same is true of the points in vacuum switches LLV and RLV.

Under the foregoing conditions, any time that a switch diaphragm such as 130, for example, is subjected to vacuum within its vacuum column, atmospheric pressure on the opposite side of the diaphragm will cause transfer of the switch points, i.e., the points RUV-1 of FIG. 9, for example, will open, while the points RUV-2 will close.

Electrical connections with the switch blades are made through a connecting bushing 138 at one end of the base plate 122.

During normal operation of the machine, the tape loops in columns 24 and 26 will be disposed between switches RUV—RLV and LUV—LLV of the respective column pairs. Under these conditions the switches LUV and RUV are subject to atmospheric pressure only, whereas switches LLV and RLV are influenced by vacuum in the columns 24 and 26, the tape loops constituting a column air seal above the switches LLV and RLV.

The device is designed so that the tape loops in the control columns 24 and 26 are maintained between the respective upper and lower vacuum switches. To this end the vacuum switch LUV is in the control circuit of the magnetic coil in the unreeling clutch 46, while the vacuum switch LLV is in the control circuit for the magnetic coil of the reeling clutch 44. In like manner the vacuum switch RUV is in the control circuit of the unreeling clutch 50, while the vacuum switch RLV is in the control circuit for the reeling clutch 52.

Should either tape loop drop below its lower vacuum switch, such switch will be subject to atmospheric pressure on both sides of its diaphragm 130, causing the contact points thereof to transfer. Consequently, under such conditions the switch LLV will call into action the file reel reeling clutch 44 and the switch RLV will call into operation the machine reel reeling clutch 52.

Such tape loops will be taken up by the reeling action of the respective reels, or either thereof, until the bight of the loop is above the lower control column switch, whereupon the switch will again transfer its contact points under influence of vacuum within the column.

In like fashion the upper vacuum switches LUV and RUV which are subjected to atmospheric pressure on both sides during normal operation of the machine will transfer their contact points when the bight of the tape loop rises above these switches. Under these conditions the upper switch will be subject to the vacuum within their respective control columns. The low pressure on the inner side of the diaphragm 130 will thereupon permit atmospheric pressure on the opposite side to transfer the contact points of the upper switch structure. Upon such transfer the switch LUV will serve to energize the coil in the unreeling clutch 46, and the switch RUV will call into action the unreeling clutch 50 whereby the file reel 10 and machine reel 18 respectively, or either one of them, will be rotated to unreel tape therefrom and thereby lengthen the loop in the control columns 24 and 26 respectively until the bight thereof once more drops below the upper switches LUV and RUV.

From the foregoing it will be seen that the operation of the tape reels 10 and 18 is in effect a self-compensating operation whereby the tape loops in the control columns 24 and 26 are maintained in an optimum position. Furthermore, it is apparent that the controls for the reels 10 and 18 are independent one from the other.

The second contact point of each vacuum switch is used to provide a circuit for their respective brake coils. When the control circuit is described, it will appear that a circuit is established through closed points of switches LUV and LLV to energized the coil of the file reel brake 42 and that a circuit is provided through closed points of switches RUV and RLV to energize the coil in the machine reel brake 48. It is intended that the brake coils be energized whenever the reeling and unreeling clutches are deenergized.

Figure 10:
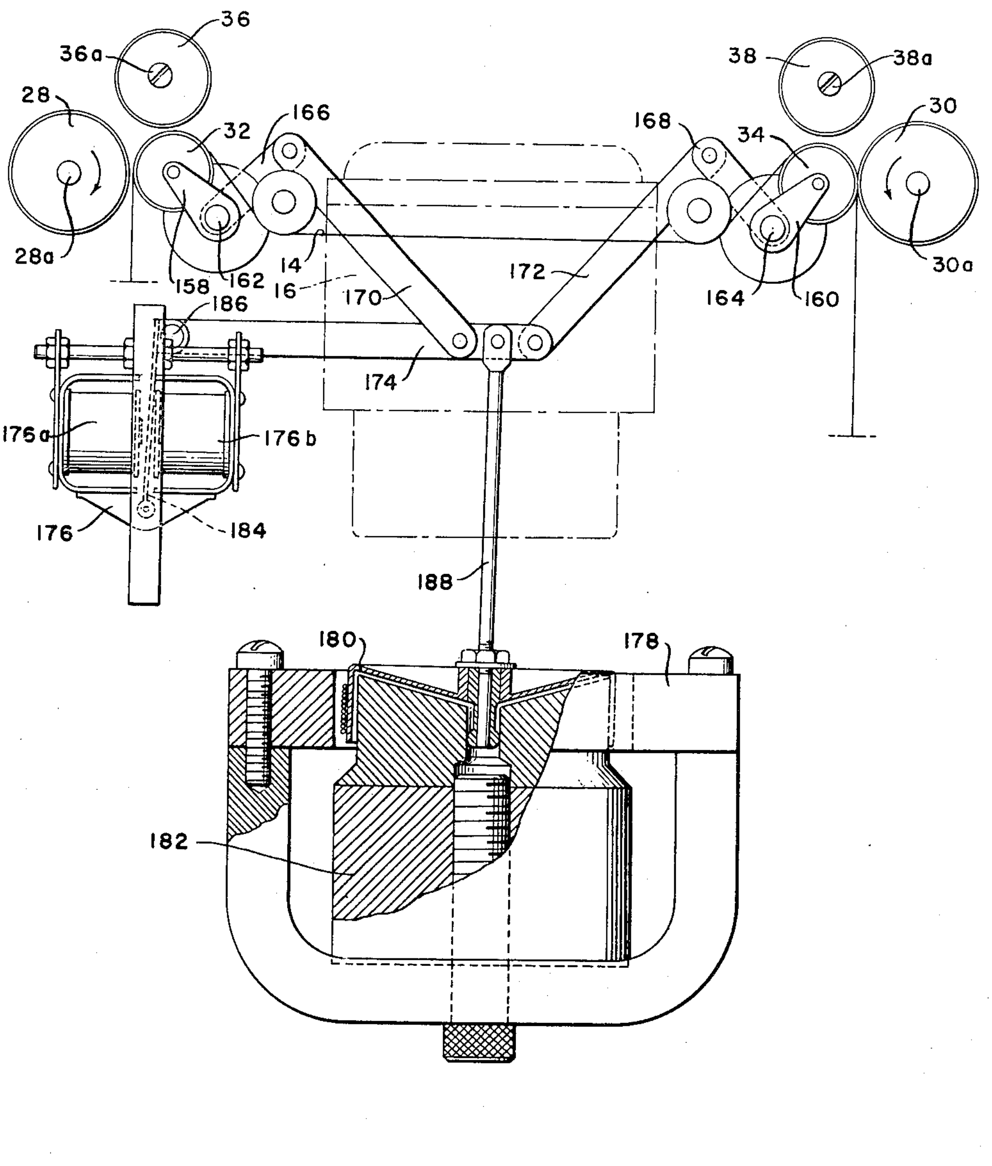
FIG. 10 is a schematic view, partly in section, which illustrates the tape drive mechanism and the means for biasing the mechanism into tape driving position, the view showing the parts biased into position for driving the tape in a forward direction.

The mechanism for driving the tape through the tape head 16 is shown in FIG. 10 of the drawings. The drive capstans 28 and 30 are constantly driven by means of a motor 142 (FIG. 3) whose shaft 144 rotates in a clockwise direction. The drive capstans 28 and 30 are journalled for rotation in the face panel 13 of the machine, and the shafts 28*a* and 30*a* extend to the rear of the panel 13 where they have affixed thereto belt pulleys 146 and 148 (FIG. 3) respectively. A drive belt 150 is trained about the pulleys 146, 148 and about a motor shaft pulley 152 so that upon clockwise rotation of the motor shaft 144 the capstan shaft 28*a* will be rotated in a clockwise direction while the capstan shaft 30*a* will be rotated in a counterclockwise direction. This is accomplished by the use of an idler pulley 154 mounted on a spring-biased lever 156.

By reference to FIG. 10 of the drawings it will be seen that the tape moving idler pulleys 32 and 34 are mounted for rotation at the free end of levers 158 and 160 respectively. The inner ends of the levers 158 and 160 are fixed to pivot shafts 162 and 164 respectively. The pivot shafts 162 and 164 are journalled for rocking movement in the face panel 13, and each of these shafts has attached thereto a short, upwardly extending link 166 and 168 respectively. The inner, free ends of the links 166 and 168 have pivoted thereto levers 170 and 172 respectively which have their opposite ends pivoted to a common operating lever 174.

With the foregoing structure the tape moving idler pulleys 32 and 34 may be selectively engaged with their related drive capstan and with their stop capstan. Thus the tape moving idler pulley 32 may be brought into contact with the reverse drive capstan 28 or with the forward stop capstan 36. The tape moving idler pulley 34 may be selectively engaged with the forward drive capstan 30 or with the reverse stop capstan 38. The stop capstans 36 and 38 are eccentrically mounted in the face panel 13 by means of screws 36*a* and 38*a* about which the capstans may be adjusted to vary their braking effect.

In order to impart controlled movement to the tape moving idler pulleys 32 and 34, there has been provided herein a forward-reverse actuator 176 comprising a pair of aligned, high speed relay magnets 176*a* and 176*b* and a stop or drive actuator 178 which consists of a coil 180 in a field of high flux density caused by a permanent magnet 182. The high speed relay coils 176*a* and 176*b* are mounted on a supporting yoke in axial relation to each other and with the provision of a space between the magnets to accommodate a pivoted armature 184 to the free end of which the operating lever 174 is attached by means of a pivot stud 186.

The coil 180 of the stop-drive actuator has affixed thereto a rod 188 which is connected to the operating lever 174 midway between the connections of the levers 170 and 172.

When the relay magnet 176*b* is energized, the armature 184 will be attracted thereto and the operating lever 174 will be biased to the right in FIG. 10. This elevates the tape moving idler 32 a half gap width above the tape moving idler 34. When the stop-drive actuator 178 is energized to repel the coil 180 thereof, an upward thrust will be delivered to the rod 188. This will further move the drive linkage to force the tape moving idler pulleys downwardly and outwardly until the tape moving idler pulley 34 is engaged with the forward drive capstan 30. This will cause the tape 14 to be driven downwardly into the control column 26.

The foregoing describes one of four stable positions into which the tape moving idler pulleys may be biased. The three other positions can be ascertained from a study of FIG. 10 or by reference to aforesaid Patent 2,792,217 where they are illustrated and described in some detail.

In FIG. 1 is shown a pair of tape contact arms 190 and 192. These arms are mounted for pivoting movement so that the ends thereof may ride freely in contact with the tape coils on the respective reels 10 and 18. Through this medium is provided a control mechanism to prevent the complete run-out of tape from the reels. The details of the tape contact arms are omitted from this application, but they are fully described and illustrated in said Weidenhammer and Buslik Patent 2,792,217.

Figure 13:
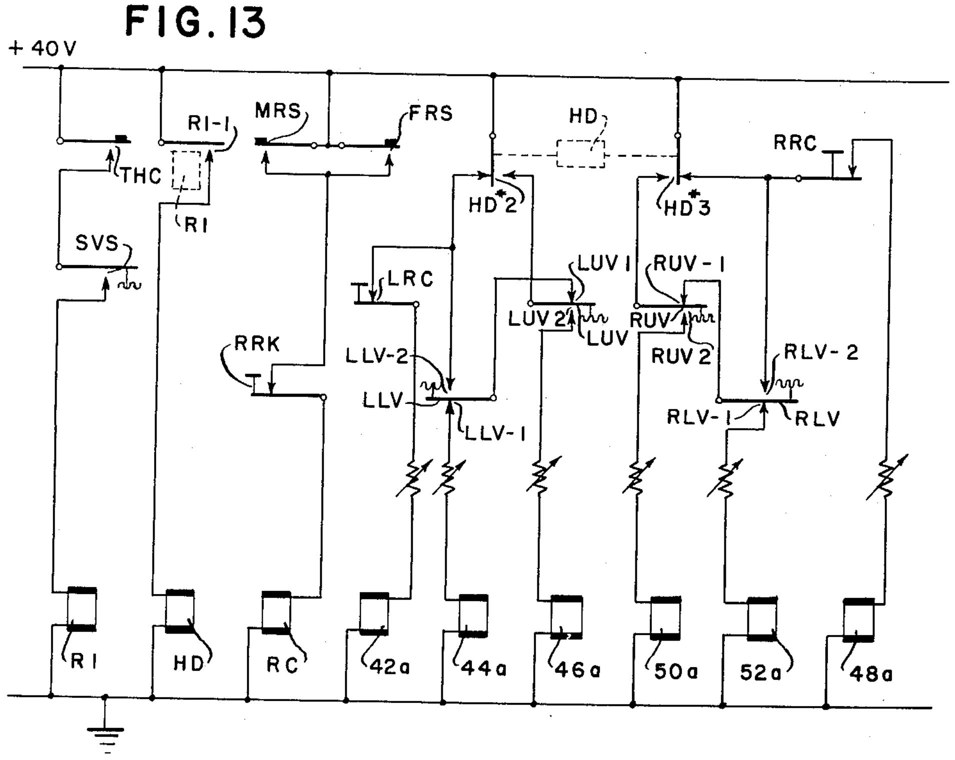
FIG. 13 is a diagram of the electrical control circuit by which rotation of the tape reels is controlled.

The mechanism is put into operatiion by closure of the line switch LS (FIG. 14) which supplies 115 volt alternating current to the vacuum pump motor VPM. The same circuit includes transformers T (only diagrammatically indicated) from which are derived the 40 volt power supply and the high voltage power supply. Most of the relays, such as those shown in FIG. 13, are connected across the 40 volt power supply line, while the high voltage supply provides the various plate voltages, bias voltages, etc. required by the several electronic units.

As soon as voltage appears on the +40 volt line, the run relay R1 (FIG. 13) is energized through the thread handle contact THC and the safety vacuum switch contact SVS. If there is a tape loop in the control columns 24 and 26, thus forming an air seal between the upper and lower vacuum switches, and if the vacuum motor VPM is operating, the safety vacuum switch SVS in the header 108 (FIG. 1) will be closed by the vacuum built up in the header 108 by the vacuum pump. If the tape sensing arm operating handle 208 (FIG. 2) is in a horizontal position, the thread handle contact THC (FIG. 3) will be closed.

When the relay R1 (FIG. 13) is energized, its associated point R1–1 closes, thereby energizing a heavy duty relay HD. Energization of the heavy duty relay HD causes its HD–1 point (FIG. 14) to close and its HD–2 and HD–3 points (FIG. 13) to transfer.

Figure 14:
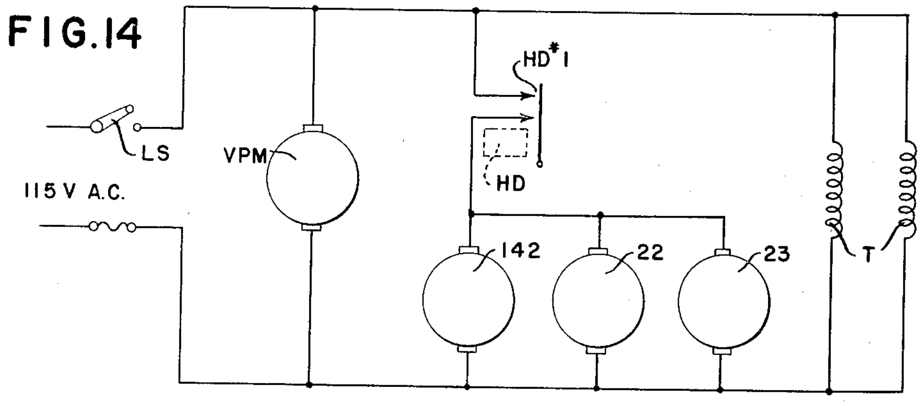
FIG. 14 is a diagram of the motor control and power supply circuit.

By reference to FIG. 14 of the drawings, it will be seen that closure of the HD–1 point closes the circuit of the capstan motor 142 as well as the circuit of the two reel motors 22 and 23.

Figure 12:
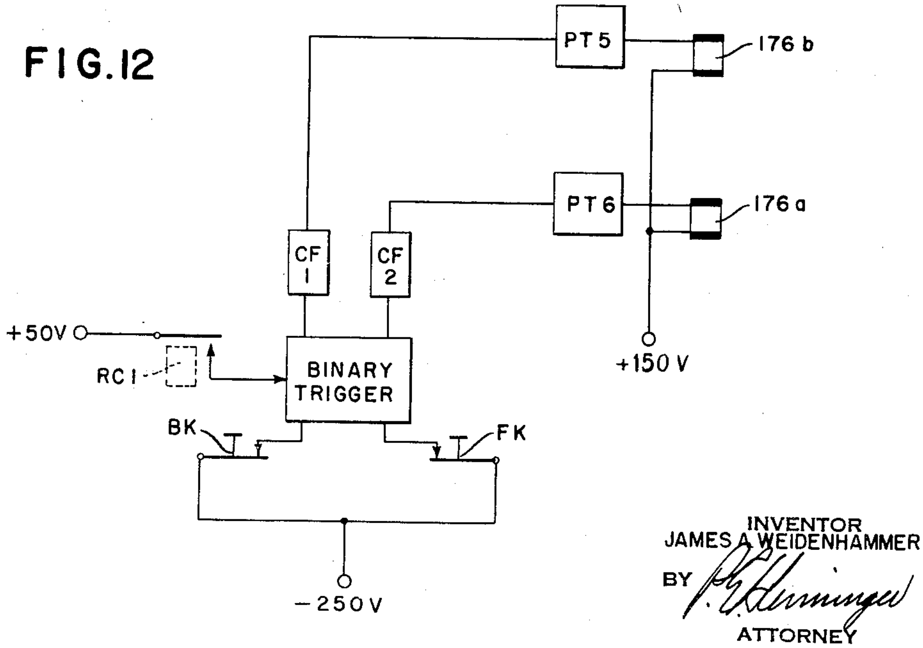
FIG. 12 is a diagram of the electrical control circuit for biasing the tape feed mechanism into forward or reverse feed position.

If it is desired to feed tape from the file reel 10 to the machine reel 18, a forward key FK (FIGS. 1 and 12) is pressed to open its contact, or if reverse feed from the machine reel 18 to the file reel 10 is required, a backward key BK is depressed to open its contact. Depression of the forward key FK, for example, removes the −250 volt bias supply from the right side of a binary trigger. As a result, the right side of the trigger is rendered conductive, while the left side is rendered non-conductive. With the left side of the trigger being non-conductive, its plate voltage is high. Thus the voltage on the tube side of a cathode resistor of an associated cathode follower CF1 is high and the grid of a connected power tube PT5 is high. With the grid of the power tube PT5 being high, the power tube PT5 conducts heavily and the forward control magnet **176*b* is energized. This will condition the tape moving idler pulley 34 for driving engagement with the forward drive capstan 30**, as fully shown in said Patent 2,792,217.

Figure 11:
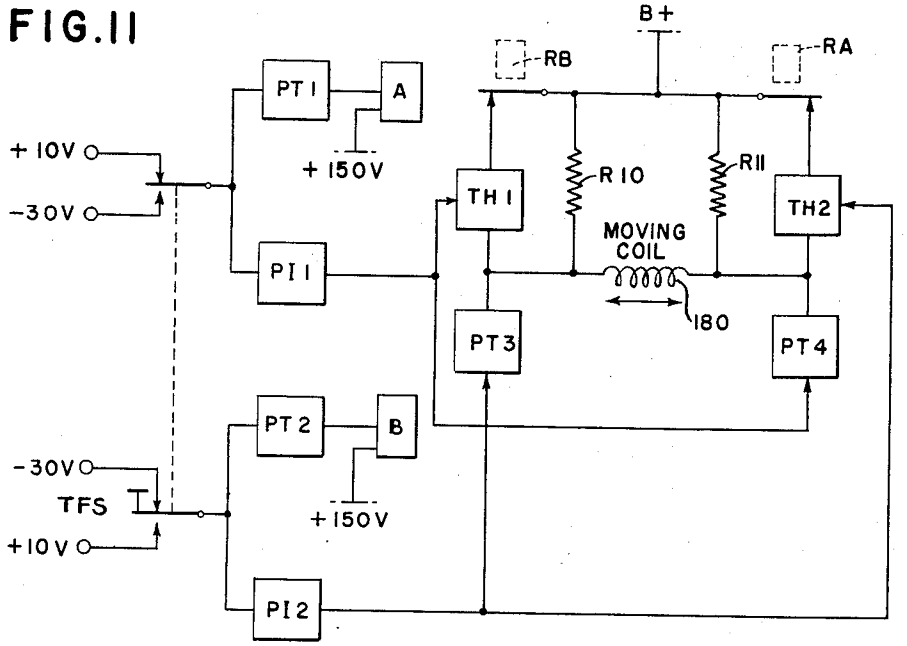
FIG. 11 is a diagram of the electrical control circuit for controlling tape feed through the tape reading head.

Thereafter actual tape feeding in a forward direction is started by depressing a tape feed control switch TFS (FIGS. 1 and 11). Transferring of this switch applies −30 volts to the grids of a power tube PT1 and a power inverter PI1, while +10 volts are applied to a power tube PT2 and a power inverter PI2. Power tube PT2 and power inverter PI2 are thus rendered conductive, while the power tube PT1 and power inverter PI1 are rendered non-conductive. When the power tube PT2 conducts, it energizes the relay B. However, it takes an appreciable time for the relay B to become sufficiently energized to open its RB point. During this interval by which relay point RB opens, the following action takes place. As the power inverter PI1 goes non-conductive, its plate swings positive. This positive swing is applied to the grid of a thyratron TH1 and the grid of a power tube PT4. The thyratron TH1 fires and the power tube PT4 is rendered conductive. The firing of the thyratron TH1 in effect shorts out resistance R10, and with relay point RB still closed at this time a heavy surge of current passes from B+, through the thyratron TH1, through the moving coil 180 and then through the power tube PT4. This surge of current repels the moving coil 180 from a permanent magnet 182, thereby delivering an upward thrust to the rod 188 which projects the moving idler pulley 34 into contact with the forward drive capstan 30 for driving the tape in a forward direction as fully described in said Patent 2,792,217.

When relay point RB opens, the thyratron TH1 is dropped out. The power tube PT4 then draws a smaller amount of current through the resistance R10 and the moving coil. This smaller amount of current is sufficient to keep the moving coil 180 energized so that the tape continues to feed. The initial surge through the thyratron TH1 is used only to give a rapid starting action to the tape drive linkage.

If the tape feed key TFS is restored to its normal position, the moving coil is energized in a direction to stop tape feed. The rapid stop action is obtained by an initial surge through the thyratron TH2, whereafter the opening of point RA of the relay C cuts the limiting resistor R11 into the plate circuit of the power tube PT3.

In order to obtain a reverse or backward feed motion of the tape, the backward key BK is opened, thereby energizing the relay **176*a* which will condition the moving idler pulley 32 for engagement with the reverse drive capstan 28 when the moving coil 180 is again energized to cause an upward thrust on the rod 188**, thereby bringing the tape feeding mechanism into the position required to feed tape in the reverse direction.

During the time that the tape 14 is actually being fed through the tape head 16, it is under the control of the vacuum switches LUV, LLV, RUV and RLV (FIG. 13). As explained heretofore, these switches are sensitive to the vacuum within the columns 24 and 26 and control the brake and clutch mechanism shown in FIGS. 4 and 5 of the drawings.

Whenever the tape reels 10 or 18 are at rest, they are under control of their respective brakes 42 and 48. These brake circuits are energized as soon as power appears on the 40 volt power line and even before the transfer of the heavy duty relay HD. In such case the brake magnet **42*a* is energized from the +40 volt line through the untransferred HD–2 point (FIG. 13), the closed left reel release contact LRC through the brake magnet 42*a* and ground. The brake magnet 48*a* is energized by a circuit from the +40 volt supply line, through the untransferred HD–3 point, through the right reel release contact RRC, the brake magnet 48*a*** and ground.

When the heavy duty relay HD is energized, it transfers its HD–2 and HD–3 points. Thereafter, the energizing circuit for the brake magnets **42*a* and 48*a* is through the respective vacuum switch structures. Let it be assumed that the tape loops now occupy a normal, relatively stable position between the vacuum switches LUV and LLV in column 24 and RUV and RLV in column 26. Under these conditions the brake magnet 42*a* will be energized by current from the +40 volt supply line, through the now transferred point HD–2, through the normally closed point LUV–1 of the upper vacuum switch LUV, through the transferred point LLV–2 of the left lower vacuum switch LLV which is now subject to the rarefied atmosphere within the column 24, through the left reel release contact LRC, the brake magnet 42*a*** and ground.

Energization of the brake magnet **48*a* under these same conditions is effected from the 40 volt power line, through the transferred contact HD–3, the normally closed RUV–1 contact of the right upper vacuum switch RUV, through the transferred point RLV–2 of the right lower vacuum switch RLV (the vacuum switch RLV now being subject to the rarefied atmosphere in the vacuum column 26), through the normally closed right reel release contact RRC, the brake magnet 48*a*** and ground.

Should the tape loop in the vacuum column 24 rise above the left upper vacuum switch LUV, that switch will be subjected to the rarefied atmosphere in the vacuum column 24 with the result that its LUV–1 point will be opened and its LUV–2 point will be closed. The energizing circuit to the brake magnet 42*a* is broken when the LUV–1 point opens and the circuit to the unreeling clutch magnet 46*a* is closed. The magnet 46*a* will be energized from the power line, through the transferred HD–2 point, and the now closed LUV–2 point of the left upper vacuum switch LUV will provide a circuit for the energization of the unreeling clutch magnet 46*a*.

When the tape loop in the vacuum column 24 drops below the left lower vacuum switch LLV, that switch will be subject to atmospheric pressure on both sides thereof, with the result that its contact LLV–2 will open and its contact LLV–1 will close. The first effect of this operation is to break the circuit for the brake magnet 42*a* which is through the LLV–2 point of the switch. Thereafter, upon closure of the LLV–1 point of the left lower vacuum switch, a circuit is provided for the reeling clutch magnet 44*a*, this circuit being from the positive side of the line through the transferred HD–2 point, the normally closed LUV–1 point of the left upper vacuum switch LUV, through the now normally closed point LLV–1 of the left lower vacuum switch LLV to the clutch magnet 44*a* and to ground.

The function of the vacuum switches RUV and RLV in the vacuum column 26 is precisely the same as that described in connection with the switches in the vacuum column 24. It is believed that the description thereof need not be labored in this specification, since an understanding of the operation should be clear from the specific description given in connection with the vacuum switches in the vacuum column 24. It will suffice to say that as the tape loops in the respective columns rise, the upper vacuum switches LUV and RUV will be subject to rarefied atmosphere in the column which will cause atmospheric pressure to transfer the points thereof, whereby the unreeling clutch magnets 46*a* and 50*a* are energized to supply tape to the vacuum columns. By the same token, when the tape loops drop below the lower vacuum switches LLV and RLV, these switches which have been subjected to vacuum within the respective columns 24 and 26 will transfer their points to establish an energizing circuit for the reeling clutch magnets 44*a* and 52*a*. At such times that the reeling or unreeling clutch magnets are deenergized, the circuit is such as pointed out hereinabove that the brake magnets 42*a* and 48*a* are energized to lock the reels 10 and 18 respectively against rotation. It remains to be noted, however, that the reels 10 and 18 may be selectively released from the influence of their brakes by breaking their energizing circuits through the opening of the reel release contact LRC which is provided for the control of the brake magnets 42*a* or the right reel release contact RRC which is provided for the control of the brake magnet 48*a*.

As indicated in FIG. 13 of the drawings, the normally open file reel switch FRS and machine reel switch MRS are paralleled and connected into the pick-up circuit of a relay RC. Assuming that the tape is feeding from the file reel to the machine reel, when the file reel is almost empty the file reel switch FRS closes and the relay RC is energized. Energization of the relay RC causes its point RC1 (FIG. 12) to close. Closure of relay points RC1 supplies a positive voltage to the grids of both sides of the binary trigger. This voltage drives the left side of the trigger into a conductive condition, and the trigger assumes its opposite stable position. The turning of the trigger energizes the backward magnet 176*a*, and as a result the moving idler pulley 32 is brought into driving contact with the reverse drive capstan 28, thereby causing feed of tape in a reverse direction, i.e., from the machine reel back to the file reel. When it is desired to run the tape completely off one reel or the other, the reel run-out key RRK (FIG. 13) is held depressed so that the reversing relay RC cannot be energized.

When it is desired to move either of the reels 10 or 18, related reel release contacts LRC and RRC are opened. The reel release contact LRC is in the circuit of the brake 42, while the reel release contact RRC is in the circuit of the brake 48. Consequently, opening of the contact LRC will deenergize the brake 42, while opening of the contact RRC will deenergize the brake 48. This will permit free manual turning of either of the reels so released.

It should be understood that the present disclosure is for the purpose of illustration only and that this invention includes all modifications and equivalents which fall within the scope of the appended claims.

What is claimed is:

1. In a machine for reeling and unreeling tape, a supporting panel, a pair of tape reels mounted in said panel for rotation thereby adapting said reels for reeling and unreeling a tape extending therebetween, means for driving each of said reels, a tape receptacle associated with each reel comprising a guide for a tape loop therein, means for maintaining a differential in atmospheric pressure on opposite faces of a tape loop within said receptacles, a pair of reel driving means activating devices responsive to a differential in atmospheric pressure operatively associated with each of said receptacles rsponsive to the position of a tape in said receptacles to control the respectively associated reel driving means, and means for supporting a free tape loop in each of said receptacles whereby a tape loop in said receptacles is adapted for selecting for control one or the other reel driving means activating device of each receptacle.

2. In a machine for reeling and unreeling tape, a supporting panel, a pair of tape reels mounted in said panel for rotation thereby adapting said reels for reeling and unreeling a tape extending therebetween, driving means for each said reel, a vacuum receptacle for each said reel, means for exhausting atmosphere from said receptacles, means for supporting a loop of tape from each said reel in its respective vacuum receptacle, and vacuum responsive means operatively associated with each receptacle under control of tape loops therein for controlling the driving means associated with each said reel.

3. In a machine for reeling and unreeling tape, a pair of tape reels, independent electromagnetic means for driving each of said reels in either of two directions, a tape receptacle associated with each of said reels, means for supporting a free tape loop in each of said receptacles, and means physically independent of a tape loop in said receptacles under control of a tape loop in said receptacles for selecting an associated electromagnetic reel driving means to render the respectively associated electromagnetic reel driving means active to selectively drive the associated reel in either direction.

4. In a machine for reeling and unreeling tape, a pair of tape reels, means for driving each of said reels in either of two directions, a tape receptacle associated with each of said reels adapted to receive a tape loop therein, a pair of pressure-responsive reel driving means activating devices operatively associated with each of said receptacles adapted to control the respectively associated reel driving means, means for maintaining a differential in air pressure on opposite faces of a tape loop within said receptacles, and means for supporting a tape loop in each of said receptacles so that a tape loop in said receptacles is adapted to control the air pressure in said receptacles and one or the other pressure-responsive reel driving means activating device of a receptacle is selected for operation.

5. In a machine for reeling and unreeling tape, a pair of tape reels, independent electromagnetic means for driving each of said reels in either of two directions, a tape receptacle associated with each of said reels adapted to receive a tape loop therein, a pair of spaced pressure-responsive reel driving means activating devices operatively associated with each of said receptacles adapted to render the respectively associated electromagnetic reel driving means active to selectively drive the associated reel in either direction, means for maintaining a differential in air pressure on opposite faces of a tape loop within said receptacles, and means for supporting a tape loop in each of said receptacles for controlling the air pressure in said receptacles whereby a pressure-responsive activating device is selected to activate its associated electromagnetic reel driving means.

6. In a machine for reeling and unreeling tape, a pair of tape reels, means for driving said reels in either of two directions comprising a forward and reverse drive device operatively associated with said reels, vacuum responsive means under control of a tape running between said reels for selectively rendering operative said drive device to drive the respectively associated reel in a selected direction, and means for subjecting said last-named means to a vacuum.

7. In a machine for reeling and unreeling tape, a pair of tape reels, means for driving said reels in either of two directions comprising an electromagnetic forward drive device and an electromagnetic reverse drive device operatively associated with each reel, an electric control circuit for said electromagnetic drive devices, vacuum means including switches in said electric control circuit under control of a tape running between said reels for selectively rendering operative one or the other of said electromagnetic drive devices of each of said driving means to drive the respectively associated reel in a selected direction, and means operatively associated with said vacuum means for generating a vacuum therein.

8. In a machine for reeling and unreeling tape, a pair of tape reels, means for driving said reels in either of two directions comprising a forward and reverse drive device operatively associated with each reel, a tape loop confining receptacle associated with each tape reel, means for freely supportng a tape loop in each of said receptacles, and means operatively associated with each of said receptacles under control of a tape loop therein for selectively rendering operative one or the other of said drive devices of each of said reel driving means to drive the respectively associated reel in a selected direction.

9. In a machine for reeling and unreeling tape, a pair of tape reels, means for driving said reels in either of two directions comprising an electromagnetic forward drive device and an electromagnetic reverse drive device operatively associated with each of said tape reels, a tape loop receptacle associated with each tape reel, and means operatively associated with each of said receptacles under control of a tape loop therein for selectively rendering operative one or the other of said electromagnetic drive devices of each of said reel driving means to drive the respectively associated reel in a selected direction.

10. In a machine for reeling and unreeling tape, a pair of tape reels, means for driving said reels in either of two directions comprising an electromagnetic forward drive device and an electromagnetic reverse drive device operatively associated with each reel, a tape loop receptacle associated with each tape reel, means for exhausting atmosphere from said receptacles, means for supporting a tape loop in each of said receptacles, and a pair of vacuum responsive devices operatively associated with each of said tape loop receptacles under control of a tape loop therein for selectively rendering operative one or the other of said electromagnetic drive devices of each of said reel driving means to drive the respectively associated reel in a selected directon.

11. In a machine for reeling and unreeling tape, a pair of tape reels, means associated with each reel for driving such associated reel, a vacuum receptacle associated with each of said reels and its associated driving means, means for exhausting atmosphere from said receptacles, means for supporting a tape loop from each of said reels in its associated receptacle, and a vacuum responsive switch operatively associated with each of said receptacles under control of tape loops therein for controlling its associated reel driving means.

12. In a machine for reeling and unreeling tape, a pair of tape reels, means associated with each reel for driving such associated reel in either of two directions, a vacuum receptacle associated with each of said reels and its associated driving means, means for exhausting atmosphere from said receptacles, means for supporting a tape loop from each of said reels in its associated vacuum receptacle, and a pair of spaced vacuum responsive switches operatively associated with each of said receptacles under control of a tape loop therein for controlling its associated reel driving means.

13. In a reeling system for a tape member the system including separate tape driving means, in combination, a first and second movable tape storage means, means for imparting movement to said tape storage means, a first and second tape accumulating means associated respectively with said first and second tape storage means for receiving and substantially enclosing a slack length of tape between each of said tape storage means and said tape driving means, means positioned in cooperative association with each of said tape accumulating means and physically independent of said slack length of tape for determining the amount of tape in said two tape accumulating means, and means responsive to said determining means for controlling said means for imparting movement to said tape storage means.

14. In a machine for reeling and unreeling tape, a pair of tape reels having tape thereon, means for driving said reels, a pair of activating devices responsive to a differential in air pressure operatively connected to said reel driving means for controlling the same to render said reel driving means active to selectively drive said reels, means for subjecting said activating devices to a differential in air pressure, means for forming a slack length of tape between said reels, and means including said slack length of tape for selectively subjecting said actuating devices to a differential air pressure thereby selecting for operation one or the other activating device associated with said driving means.

15. In a machine for reeling and unreeling tape, a pair of tape reels having tape thereon, means for driving said reels in either of two directions, a pair of activating devices responsive to vacuum operatively connected to said reel driving means for controlling the same to render said reel driving means active to selectively drive said reels in either direction, means for subjecting said activating devices to a vacuum, and means under control of a length of tape running between said reels for controlling the vacuum to which said activating devices are subjected thereby selecting for operation one or the other activating device associated with said driving means.

16. In a machine for reeling and unreeling tape, a pair of tape reels having tape thereon, means for driving said reels in either of two directions including a pair of electromagnetic drive devices, a pair of activating devices responsive to a vacuum operatively connected to said reel driving means for controlling said electromagnetic drive devices to selectively drive said reels in either direction, means for subjecting said activating devices to a vacuum, and means for operatively associating a tape with said activating devices to control the effect of vacuum thereon and thereby select for operation one or the other of said pair of electromagnetic drive devices.

17. In a machine for reeling and unreeling tape, a supporting panel, a pair of tape reels mounted in said panel for rotation adapting said reels for reeling and unreeling a tape extending therebetween, means for driving each of said reels, a tape loop receptacle associated with each reel, means for supporting a free tape loop in each of said receptacles whereby said receptacles comprise guides for the movement of tape therein, means for maintaining a differential in air pressure on opposite faces of a tape in said receptacles, and reel driving means activating devices operatively connected to said means for driving said reels, said activating devices being responsive to a differential in air pressure and being operatively associated with said receptacles and under control of tape loops therein for controlling the respective reel driving means.

18. In a machine for reeling and unreeling tape, a supporting panel, a pair of tape reels mounted in said panel for rotation thereby adapting said reels for reeling and unreeling a tape extending therebetween, means for driving said reels, a tape receptacle associated with each reel, means for supporting a tape loop in each of said receptacles, means for maintaining a differential air pressure on opposite faces of a tape loop in said receptacles, and a pressure responsive reel driving means activating device operatively associated with said means for driving said reels and with each tape receptacle, said activating devices being under control of a tape loop in said receptacles whereby said associated actuating device is selected for operation.

19. In a machine for reeling and unreeling tape, a pair of tape reels, means for driving said reels in either of two directions comprising a forward and reverse drive device operatively associated with each reel, a tape loop receptacle associated with each tape reel, means for supporting a tape loop in each of said receptacles such that said receptacles are transversely divided into a pair of chambers by said tape, means for exhausting the atmosphere from one of said chambers, vacuum responsive means operatively associated with each of said receptacles under control of a tape loop therein for selectively rendering operative said drive device of each of said reel driving means to control the respectively associated reel.

20. In a machine for reeling and unreeling tape, a tape reel, reel driving means connected with said reel for driving the same, a vacuum chamber associated with said reel, means for exhausting atmosphere from said chamber, means for supporting a tape from said reel in said chamber in the form of a loop of variable length, and vacuum responsive means communicating with said chamber adapted to selectively control said reel driving means in response to variations in the length of tape looped in said chamber.

21. In a tape feeding machine, a tape supply means, a tape loop chamber having confronting walls forming a tape enclosure associated with said tape supply means for receiving and substantially enclosing a tape loop therein, means for delivering tape from said supply means to said chamber, means for withdrawing varying lengths of tape from a loop thereof within said chamber, opposite edges of a tape from said tape supply means being adapted to pass substantially in contact with said confronting walls of said chamber in passage therethrough whereby said chamber under a loop of tape therein is substantially sealed from the atmosphere, and vacuum means connected to said chamber for maintaining differential atmospheric pressure on opposite faces of a tape within said chamber whereby a tape within said chamber is maintained under tension by forming within said chamber a tape loop that varies in size according to the difference between the length of tape delivered to said chamber and the length of tape withdrawn therefrom.

22. The mechanism of claim 21 in which said chamber comprises a structure of rectangular cross-section which is enclosed from the atmosphere except for a tape entrance and exit passage therein.

23. The mechanism of claim 22 in which said chamber includes spaced side walls coacting with said confronting walls, in combination with means for guiding a tape through said tape entrance and exit passage effective to space the opposite faces of a tape loop from said spaced side walls throughout a substantial length of a tape loop in said chamber to limit tape contact with said side walls to the area of the bight of a tape loop within said chamber.

24. The mechanism of claim 22 in which said tape loop chamber is in the form of an elongated column operatively associated with said tape supply means.

25. The mechanism of claim 22 in which said tape loop chamber is in the form of an elongated column having spaced side walls coacting with said confronting walls and a tape entrance and exit passage at one end of said column, in combination with means for guiding a tape through said entrance and exit passage, said guide means being effective to restrict the space between opposite lengths of tape at said entrance and exit passage whereby the opposite faces of a tape within said column are spaced from said side walls throughout the major portion of the length of a tape loop in said column thereby limiting contact between said side walls and the opposite faces of such tape loop to the area of the bight of the tape loop in said column.

26. The mechanism of claim 24 in which said vacuum means is in communication with the interior of said column at a point remote from said tape entrance and exit passage.

27. In a tape feeding machine, a tape supply means, a tape loop chamber having confronting walls and spaced side walls coacting with said confronting walls to form a tape enclosure associated with said tape supply means for receiving and substantially enclosing a tape loop therein, means for delivering tape from said supply means to said chamber, means for withdrawing varying lengths of tape from a loop thereof within said chamber, opposite edges of a tape from said tape supply means being adapted to pass substantially in contact with said confronting walls of said chamber, and vacuum means connected to said chamber for causing the bight of a tape loop to contact with said side walls whereby said chamber under the bight therein is substantially sealed from the atmosphere.

28. In a tape feeding machine, a tape supply means, a tape loop chamber having confronting walls and spaced side walls coacting with said confronting walls to form a tape enclosure associated with said tape supply means for receiving and substantially enclosing a tape loop therein, means for delivering tape from said supply means to said chamber, means for withdrawing varying lengths of tape from a loop thereof within said chamber, opposite edges of a tape from said tape supply means being adapted to pass substantially in contact with said confronting walls of said chamber, and vacuum means connected to said chamber for causing the bight of a tape loop to contact with said side walls whereby said chamber under the bight therein is substantially sealed from the atmosphere and a tape within said chamber is maintained under tension by forming within said chamber a tape loop that varies in size according to the difference between the length of tape delivered to said chamber and the length of tape withdrawn therefrom.

29. In a tape feeding machine, a tape supply means, a tape loop chamber having confronting walls and spaced side walls coacting with said confronting walls to form a tape enclosure associated with said tape supply means for receiving and substantially enclosing a tape loop therein, a tape entrance and exit passage in said chamber, means for delivering tape from said supply means to said chamber, means for withdrawing varying lengths of tape from a loop thereof within said chamber, opposite edges of a tape from said tape supply means being adapted to pass substantially in contact with said confronting walls of said chamber, vacuum means connected to said chamber for causing the bight of a tape loop to contact with said side walls whereby said chamber under the bight therein is substantially sealed from the atmosphere, and means for guiding a tape through said entrance and exit passage, said guide means being effective to space the tape from a side wall of said chamber throughout a substantial length of the tape loop.

References Cited in the file of this patent

UNITED STATES PATENTS 2,708,554 Welsh et al. ____________ May 17, 1955